(12) United States Patent
Stevenson et al.

(10) Patent No.: US 8,349,917 B2
(45) Date of Patent: Jan. 8, 2013

(54) PRINTING INK, TRANSFERS, AND METHODS OF DECORATING POLYOLEFIN ARTICLES

(75) Inventors: Michael J. Stevenson, Sedona, AZ (US); Robert A. Reeves, Cottonwood, AZ (US)

(73) Assignee: Michael J. Stevenson, Sedona, AZ (US)

( * ) Notice: Subject to any disclaimer, the term of this patent is extended or adjusted under 35 U.S.C. 154(b) by 141 days.

(21) Appl. No.: 12/804,794

(22) Filed: Jul. 28, 2010

(65) Prior Publication Data

US 2012/0024448 A1    Feb. 2, 2012

(51) Int. Cl.
    *C09D 11/00*    (2006.01)
(52) U.S. Cl. .......... 523/160; 523/161; 156/60; 524/570; 524/585; 427/256; 427/265; 428/32.6
(58) Field of Classification Search .................. 523/160, 523/161
    See application file for complete search history.

(56) References Cited

U.S. PATENT DOCUMENTS

| | | | |
|---|---|---|---|
| 1,176,937 A * | 1/1970 | Wheeler | 384/17 |
| 4,252,762 A | 2/1981 | Stevenson | |
| 4,466,994 A | 8/1984 | Hubbard et al. | |
| 4,519,972 A | 5/1985 | Stevenson | |
| 4,536,434 A | 8/1985 | Magnotta | |
| 4,731,401 A | 3/1988 | Moteld et al. | |
| 4,910,081 A | 3/1990 | Yamaguchi et al. | |
| 5,462,788 A | 10/1995 | Ohashi et al. | |
| 5,498,307 A | 3/1996 | Stevenson | |
| 5,611,881 A | 3/1997 | Kimura et al. | |
| 5,746,961 A | 5/1998 | Stevenson et al. | |
| 5,840,142 A | 11/1998 | Stevenson | |
| 5,889,083 A * | 3/1999 | Zhu | 523/161 |
| 6,159,568 A | 12/2000 | Freedman | |
| 6,436,592 B1 * | 8/2002 | Yau et al. | 430/14 |
| 6,991,261 B2 | 1/2006 | Dronzek | |
| 7,086,726 B2 | 8/2006 | Takashima et al. | |
| 2007/0022904 A1 * | 2/2007 | Kitawaki et al. | 106/31.86 |
| 2009/0244146 A1 | 10/2009 | Chiwata | |
| 2009/0311426 A1 | 12/2009 | Nakazawa et al. | |

* cited by examiner

*Primary Examiner* — Doris Lee
(74) *Attorney, Agent, or Firm* — Robert E. Strauss

(57) ABSTRACT

The ink of the invention comprises a mixture of finely subdivided polyethylene powder, an aliphatic or aromatic hydrocarbon solvent, a dispersing agent, an indicia material additive such as a dye or pigment and/or a physical property enhancing additive such as alumina, glass beads, silica, metal flakes, etc. Preferably high and very high molecular weight polyethylene is used, alone or in mixture with lower density polyethylene in amounts from 25 to 45 weight percent in the ink. The polyethylene can have a particle size from 1 nanometer to 150 microns, preferably from 0.1 to 100 microns.

The printing ink can be used to prepare a transfer having a decorative layer printed onto a carrier sheet. Various printing methods can be used to prepare the transfer such as gravure printing with etched or engraved chrome-plated or copper rolls; flexography printing with a flexible printing plate; and screen printing. The preferred method is screen printing. The printed layer is thermally treated to remove hydrocarbon solvent.

The transfers are applied to the surfaces of molded polyethylene or polypropylene parts with adequate heat, pressure and time to fuse the transfers into the walls of the parts. For this application, the transfer is applied by a commercial hot-stamping, reciprocal press which heats the transfer to temperatures from 450° F. to 650° F., and compresses the transfers at a controlled pressure from 500 to 1000 psig. against a molded part, melting and fusing the transfers into the wall of the molded part.

12 Claims, No Drawings

PRINTING INK, TRANSFERS, AND METHODS OF DECORATING POLYOLEFIN ARTICLES

This application is a continuation in part of our copending application Ser. No. 11/521,259 filed May 20, 2006.

BACKGROUND OF THE INVENTION

1. Field of the Invention

This invention relates to a printing ink, thermal transfers prepared with the printing ink and methods of using the thermal transfers to decorate polyolefin articles.

2. Brief Statement of the Prior Art

A vast variety of articles are molded from polyolefin resins, particularly polyethylene and polypropylene resins by manufacturing techniques such as injection molding, blow molding, rotational molding and thermal forming. Decoration, including labeling, of articles molded from these resins is often not permanent, as the resins resist adhesive coatings. A common approach to enhance the adhesion of applied coatings has been to oxidize the surface of articles molded from these resins before the application of coatings. While this oxidation treatment has met with some success, it increases manufacturing time and cost of the molded articles.

Attempts to improve adhesion of labels to untreated surfaces of articles molded from polyolefin resins have included the use of heat activated labels such as disclosed in U.S. Pat. No. 7,622,171 which are applied to the articles as transfers with an adhesive layer of a vinyl acetate resin, a tackifying hydrocarbon resin and a microcrystalline wax. This approach, however, adhesively bonds the label to the article's surface. The label is not integral with the surface, but lies on top of the surface and is subject to wear and delamination.

A related problem with decoration of articles prepared from polyolefin resins by rotational molding has been eliminated with transfers printed with pigments or dyes in oil or wax which have been used as in-mold transfers that are molded into the surface of a polyolefin article as it is formed in a molding cycle and as on-mold transfers which are applied to the surface of preformed polyolefin articles; see U.S. Pat. Nos. 4,252,762; 4,519,972; 5,840,142; 6,613,830; 7,128,970; and 7,641,842. While these transfers have successfully achieved permanent decoration by fusing decorative layers into the surfaces of rotationally molded articles, they are not readily compatible with equipment used for high speed printing and decorating of mass produced polyolefin articles.

OBJECTIVES OF THE INVENTION

It is an objective of this invention to provide an ink which can be used to print thermal transfers such as labels, ribbons or foils which are compatible with and can fuse into the walls of articles molded of polyolefin resins, particularly polyethylene and polypropylene resins.

It is also an objective of this invention to provide a thermal transfer having an indicia layer which can be fused into the surface of a molded polyolefin article.

It is likewise an objective of this invention to provide a thermal transfer which can be used in heat and pressure applicators conventionally used to apply labels to preformed polyolefin articles.

It is a further objective of this invention to provide a printing ink which is environmentally friendly in that it contains substantially all recyclable ingredients.

It is another objective of this invention to provide a thermal transfer which can be used as an in-mold transfer to fuse into the wall of a polyolefin article as it is formed in a molding cycle.

It is another objective of this invention to provide an ink which can be used to form a thermal transfer foil which can be used with thermal printing to fuse indicia into the surface of polyolefin articles.

Other and related objectives will be apparent from the following description of the invention.

BRIEF DESCRIPTION OF THE INVENTION

As used herein, "ink" shall mean a composition of a liquid to semi-liquid vehicle containing a dispersed additive such as a pigment, dye or mineral to impart opacity or physical properties to a coating formed with the ink. By definition the term includes the conventional definition of a pigmented or colored liquid or paste, and also a liquid or paste containing property enhancing additives such as abrasion and flame resistant ingredients.

The ink of the invention comprises a mixture of finely subdivided polyethylene powder, an aliphatic or aromatic hydrocarbon solvent, a dispersing agent, an indicia additive such as a dye or pigment and/or a physical property enhancing additive such as alumina, glass beads, silica, metal flakes, etc. Preferably high and ultra high molecular weight polyethylene having a a density from 0.94 to 0.97 gm/cc. is used, alone or in mixture with lower density polyethylene having a medium density from 0.91 to 0.94 gm/cc in amounts from 25 to 45 weight percent in the ink. The polyethylene can have a particle size from 1 nanometer to 150 microns, preferably from 0.1 to 100 microns.

The printing ink can be used to prepare a transfer having a decorative layer printed onto a carrier sheet in a single printing step for a monochromatic transfer or in multiple printing steps for polychromatic transfers. When multiple printing steps are used, the printed layer from each step is thermally treated to remove hydrocarbon solvent prior to printing of the next, subsequent layer.

DESCRIPTION OF THE PREFERRED EMBODIMENTS

The Ink:

The printing ink of this invention is a dispersion of very finely subdivided polyolefin resin, particularly powdered polyethylene or polypropylene resin, having a particle size from 1 nanometer to 150 microns, preferably from 0.1 to 100 microns. Polyethylene and copolymers of polyethylene such as ethylene vinyl acetate copolymer, ethylene butyl acrylate copolymer, ethylene methylacrylate copolymer, ethylene ethylacrylate copolymer, ethylene butylacrylate copolymer can also be used, alone or in admixture with polyethylene or polypropylene. The preferred resin is polyethylene, particularly high and ultra high molecular weight polyethylene which has densities from 0.94 to 0.97 gm/cc. and a narrow molecular weight distribution for printing thermal transfers to be applied to a polyolefin part at low to medium pressure. When the ink is to be used for preparation of thermal transfers to be applied at medium to high pressures, lower molecular weight polyethylene having a medium density from 0.91 to 0.94 gm/cc. can be used, alone or in mixture with equal parts of the higher density resin. Polypropylene can also be used, alone or in mixture with polyethylene. Polypropylene with a high density, greater than 0.9 gm./cc. is preferred.

The powdered polyolefin resin or mixtures thereof should have a low melt index from about 0.1 to 100, preferably from 0.1 to 10, grams/10 minutes in the standard ASTM D-1238 test. The polyolefin resin powders are used at concentrations in the ink composition from 15 to about 70, preferably from 15 to 45, weight percent.

The polyolefin resin powders are dispersed in an aliphatic or aromatic hydrocarbon solvent which is non-volatile at the printing temperature and which has sufficient volatility for substantially total removal at the temperature of the thermal treatment of the printed image. The hydrocarbon solvent forms the continuous phase of the ink. Preferably the solvent should have a clear, bright appearance and a Saybolt color 30 or greater. Most preferably, an aliphatic hydrocarbon solvent is used. The hydrocarbon solvent is used at sufficient concentration to form a stable dispersion of the polyethylene and polypropylene resin powders (approximately equal weight parts of resin and solvent) at concentrations in the ink composition from 25 to about 45, preferably from 30 to 40, weight percent.

A dispersant is added to promote and stabilize the dispersion of polyolefin resin powders, pigments, dyes, and additives in the hydrocarbon solvent. This forms an ink having a liquid to a thixotropic paste consistency. Numerous agents which have been acknowledged as useful to disperse dyes and pigments in hydrocarbon solvents can be used, such as rosin derivatives, fluorinated polyesters, acrylic resins, phosphated polyesters, ethyleneamines such as diethylenetriamine ethylenediamine, triethylenetetramine, tetraethylenepentamine, manganese soaps of distilled tall oil fatty acids, etc. U.S. Pat. No. 5,792,730 describes a useful dispersant as the condensation product of a hydrocarbyl-substituted succinic anhydride or reactive equivalent thereof with an alkylene polyamine, wherein the alkylene polyamine is a condensed amine. The preferred dispersing agents are succinimide dispersants. The dispersant is used at a concentration as required to promote and stabilize the dispersion in the hydrocarbon solvent of the resin powders and, if also present, the other additives such as pigments and minerals. A typical concentration of dispersant is from about 0.05 to 2.0 weight percent in the ink composition.

The ink composition also contains an additive selected for the intended use of the ink. It is preferred that the particle size of any additive be in the same size range as that of the polyolefin particles. The additive is used at a concentration from 1 to 70 weight percent, with more limited concentrations dependent on the choice of additive. When the ink is to be used as a printing ink for the preparation of a graphic or alphanumeric layers, a colorant is added at a concentration from 1 to 45 weight percent. Useful colorants for the printing ink can be pigments and dyes as well as metal particles in flake or ball shape. Preferred pigments are inorganic pigments such as titanium dioxides (rutile analase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide or cadmium sulfoselenides, nickel and titanium dioxide mixtures; sodium, potassium or ammonium coordination compounds of ferriferrocyanide; ultramarine blues (a calcined mixture of china clay, sodium carbonate, silica, sulfur and reducing agents); cobalt aluminate (cobalt blues); chromium oxide; metal flake pigments such as aluminum zinc copper borate powders; metallic silver pigments; pearlescent and iridescent flakes of basic lead carbonates, bismuth oxychiorides and titanium coated mica, etc. Various organic pigments which are useful include azo pigments such as benzimidazolone pigments, pyrazolorie pigments, copper phthalocyanine quinacrjdones, anthraquinones, condensation pigments, tetrachloro-isoindolinones, carbon blacks, etc. Other pigments which can be used include iridescent pigments; daylight fluorescent pigments (fluorescent dyes dissolved in a plastic matrix); and fluorescent ink bases The pigments or dyes which are selected for use in the ink of the invention should be stable at high temperatures, e.g., up to about 500° F., as the indicia layers of the transfers will be heated to such high temperatures to fuse into the walls of the molded parts.

The concentration of the colorant in the ink composition varies considerably, dependent on the selection of the colorant. Typically, the concentration will be from 1 to 45 weight percent, preferably from about 25 to 35 weight percent.

Other additives which can be used, alone or in combination with colorants, include minerals such as feldspars, quartz, mica, hematite, magnetite, chromite spinel, rutile, talc, calcite, fluorite, apatite, orthoclase, quartz, corundum as well as synthetic minerals such as silicon carbide, alumina, zirconium dioxide, ground glass particles, glass beads, fused silica particles or beads and crystalline silica, preferred for white or colorless coatings; particles of talc, calcium carbonate, bentonite clay; ceramics such as silica-alumina ceramics and alkali alumino-silicate ceramics. These additives are used to adjust the physical properties of the ink composition and can be added to the ink at a concentration as required to adjust the ink viscosity to an optimum value for the intended printing operation. Minerals can also be added to reduce shrinkage of the transfer layers or to enhance the abrasion resistance of the fused transfer.

Typical concentrations of mineral additives are from 1 to 70, preferably from 5to 45, weight percent. For conventional screen printing the viscosity is adjusted with an additive at a concentration from 1 to 10 weight percent to provide a thixotropic liquid having a viscosity from 10,000 to 20,000 centipoise seconds suitable for screen printing. Other printing methods, e.g,.off-set printing, require inks with different viscosities.

Electric circuits can be included in the transfer by use of metal particles as the additive, such as aluminum, nickel, silver and copper. The metal particles also serve as a thickening agent in the ink of this invention. Metallic flakes are preferred and copper flakes are most preferred for their superior electrical conductivity. In this manner, RFID circuits can be fused into the surface of a polyethylene part.

The ink composition can be used to print clear coatings having no colorant. In such colorless coatings the concentration of the additive can be from 15 to 70 weight percent to adjust for viscosity, shrinkage and abrasion control.

The ink of this invention is free of wax and free of an adhesive, as these additives compromise the physical properties of the printed image. The ink is an environmentally friendly composition as it is entirely recyclable and does not add any non-recyclable components to the polyolefin surface on which it is applied.

The Preferred Printing Method:

Various printing methods can be used to prepare the transfer such as gravure printing with etched or engraved chromeplated or copper rolls; flexography printing with a flexible printing plate; and screen printing. The preferred method is screen printing of the graphics onto a carrier sheet which can be paper or a plastic film, e.g., a polyester film which is preferably transparent.

The carrier sheet functions to support the printed transfer during its storage, shipping and handling and is removed when the transfer is applied to the polyethylene part. A wide variety of sheets, rolls or ribbons can be used as a carrier sheet, and can be formed of paper, synthetic paper, plastic films such as cast, blown, calendered or extruded films of polyethylene, polypropylene, polyester, polyamide, polyvinyl chloride, etc. A preferred film is polyester film.

Useful screens for screen printing can be of Nylon and polyester threads, however, steel screens can also be used. Areas of the screen are blocked off with a non-permeable material to form a stencil, which is a negative of the image to be printed; that is, the open spaces are where the ink will appear. Screens are specified in mesh count which is the number of threads per inch (tpi). Typical mesh counts for screen printing range from 85 tpi to 355 tpi. Selection of the mesh count determines the thickness of the ink deposit and the size of halftones that can be printed. Printing screens of fine mesh (230 to 300 mesh) are preferred for halftone work to obtain photographic quality of the print image.

Monochromatic graphics are printed in a single step. Multichromatic graphics are usually printed in multiple printing steps as each color is printed separately. Alternatively, two or more stencils can be placed in butt registration, permitting the printing of two or more colors in a single step. A background layer for the graphics can be printed over the indicia print layer, using the ink containing a pigment selected for the background, e.g., titanium dioxide powder is used for a white background. The graphic or indicia layers are printed at thicknesses from 0.5 to about 2 mils, preferably about 1 mil.

The preferred screen printing method is practiced at ambient temperature. For optimum screen printing the graphics and background the ink should have a viscosity from about 10,000 to 20,000 centipoise seconds at the printing temperature.

The printed image is thermally treated to remove substantially all the hydrocarbon solvent. This is preferably achieved in a gas-fired or electrical infrared heated drying oven having a continuous belt conveyer to transport the carrier sheet and printed image through the oven at a temperature, e.g. typically from 300° F. to 500° F., and a period of time, e.g., from 30 seconds to several minutes sufficient to volatilize substantially all the hydrocarbon solvent. The oven can be provided with volatile recovery equipment to recover and reuse the hydrocarbon solvent.

It is preferred to thermally treat each printed layer prior to printing of the next succeeding or adjacent layer to avoid migration of the printed layers.

Application of the Transfers

Hot Stamping:

The transfers are applied to the surfaces of molded polyethylene or polypropylene parts with adequate heat, pressure and time to fuse the transfers into the walls of the parts. For this application, the transfers can be printed on a continuous strip of a carrier sheet which is wound into a roll having uniformly spaced transfers that are applied by a commercial hot-stamping, reciprocal press that receives a supply of molded parts across a stationary platen and has a reciprocating and heated platen which heats the transfers to temperatures from 450° F. to 650° F., preferably from 475° F. to 550° F. and compresses the transfers at a controlled pressure from 500 to 1000 psig. against the molded parts, melting and fusing the transfers. The application of heat and pressure is maintained for a period of time (dwell time) from 2 to 15 seconds, preferably from 6 to 10 seconds, sufficient to fuse the transfers into the surfaces of the molded parts. The press can be fitted with an automatic indexer to apply the transfers to injected molded parts at capacities up to 1200 pieces per hour.

Thermal Transferring:

The transfers can also be applied to molded parts by applying each transfer with its printed side placed against the surface of the part to be decorated. The part surface can be preheated with a suitable heat source such as a forced air oven, open flame, or infrared heater. It is preferred to apply the transfer at a temperature from 80° to 140° F. (transfer application temperature), which permits release of the printed layer from the carrier sheet. After the transfer is applied, heating of the transfer and part surface is continued, and the transfer is pressed against the part surface, preferably with a burnishing tool which is rubbed over the carrier sheet, releasing the transfer from the carrier sheet which is removed and the printed image of the transfer is fused into the surface of the molded part. This application method can be used to decorate or label hollow form products which are not suitable for the hot stamping method of application. Preferably, transfers for this application are prepared with polyethylene powders having medium to high density resin, e.g., 0.91 to 0.94 grams/cc. and a low melt index, e.g. 0.1 to 10 grams/10 minutes.

The application of the transfer to a polyolefin part can be facilitated by including a top coating of an adhesive or wax over the last printed, i.e., top, film of the transfer or as a coating over the polyolefin part prior to application of the transfer. Useful adhesives include aliphatic and aromatic hydrocarbon tackifiers and useful waxes include microcrystalline wax, paraffin wax and synthetic wax. The top coating is applied at a thickness from 0.5 to about 5 mils and functions as an aid in transferring the printed transfer from the carrier sheet to the polyethylene part and in elimination of any occluded air from between the transfer and the surface of the polyethylene part.

The adhesive or wax used in a top coating or as a coating on a polyolefin part must be compatible with the surface of the part. A simple test for compatibility is to prepare a sample transfer with a top coating of the coating candidate, apply the transfer to a polyolefin surface, fuse the transfer into polyolefin surface and then inspect the surface for any adhesive or wax residue and conduct a peel test on the applied transfer in accordance with ASTM D3359 test procedure.

Thermal Transfer Printing:

The ink of this invention can also be used to coat ribbons of a carrier sheet which are useful for thermal transfer printing. In this application, a thin, continuous coating of the ink is applied to a ribbon, preferably of a polyester film, at a suitable thickness, e.g., from 1 to 5, preferably from 2-4 mils. The ink is cured by heating, preferably in an oven, as previously described and the cured ribbon is wound into a roll useful with a thermal transfer printer. The printer has a thermal print head which is activated by a control mechanism to contact the ribbon and transfer an image to an underlying substrate, e.g., to form a bar code image or to print a label. When used to print labels, the print head has areas (pixels) which are heated or cooled to transfer an image from the ribbon to the label substrate.

Pad Transfer Printing

This method is used for printing parts having textured or irregular surfaces, such as golf balls which have a dimpled exterior surface. The printing platen has a contoured surface to conform to the spherical surface of the golf ball and has a pad formed of a compressible foam which is imprinted with an ink image that is transferred to the golf ball when the pad is compressed against the ball.

The following examples will serve to illustrate applications of the printing ink and results obtainable with the invention.

EXAMPLE 1

A printing ink is prepared by adding 5 weight parts succinimide dispersant to 168 weight parts of an aliphatic hydrocarbon solvent, followed by the addition of 167 weight parts of polyethylene powders having a size range from 10 to 30 microns. The mixture is stirred for 10 minutes to form a dispersion of the polyethylene powders in the solvent. Then 15 weight parts carbon black are added and the mixture is stirred for ten minutes and 5 weight parts silica is added to adjust the viscosity to obtain an ink suitable for screen printing.

A transfer of an alpha numeric indicia is printed onto a polyester carrier sheet with a 220 tpi polyester stencil screen. The transfer is then thermally treated by placing it onto a continuous belt conveyor of an electric infrared heater and passed through the oven heated to a temperature of 300° F. with a resident time of 40 seconds, sufficient to volatilize substantially all the hydrocarbon solvent, drying the printed image.

EXAMPLE 2

The procedure of Example 1 is repeated with the added step of overprinting a white background on the alpha numeric image prepared as in Example 1. The printing ink used for the background layer is prepared following the ink preparation method of Example 1 with the substitution of titanium dioxide powder for the carbon black in the ink of Example 1. The titanium dioxide powder is used at a concentration of 20 weight percent in the ink composition. The background is printed over the image on the transfer through a 280 tpi polyester screen. The transfer is then thermally treated by placing it onto a continuous belt conveyor of an electric infrared heater at 300° F. to remove the hydrocarbon solvent from the printed background layer.

EXAMPLE 3

A transfer is prepared having a protective clear coating which is printed onto the carrier sheet with a printing ink formulated as in Example 1 with the exception of the substitution of 7 weight parts of silicon dioxide powders for the carbon black pigment. The clear protective coating is printed onto a clear polyester carrier sheet using a 220 tpi screen and the printed layer is dried by removing the hydrocarbon solvent in the electric oven in the manner described in Example 1.

An alpha numeric indicia is printed over the protective clear coating with a 220 tpi polyester stencil screen using the ink as prepared in Example 1 and the printed indicia layer is dried by removing the hydrocarbon solvent in the electric oven as described in Example 1.

Finally a white background layer is printed over the dried alpha numeric indicia layer and is dried in the electric oven following the procedure of Example 2.

EXAMPLE 4

The black ink prepared in Example 1 is used for screen printing of labels onto a strip of a polyester film using a continuous strip screen printer in which the film strip is passed beneath a 350 tpi screen bearing a stencil pattern for the label indicia. The film strip is momentarily positioned paused beneath the screen and an ink layer is screeded through the screen onto the film strip depositing an indicia layer. The freshly printed label is then passed beneath an infrared heater which heats the printed layer to 300° F. for a period of 25 seconds to volatilize the hydrocarbon solvent and produce a continuous strip with transfers evenly deposited and spaced on the polyester film. The printed strip is continuously wound onto a spool which is used in a commercial hot-stamping press having a reciprocating, heated platen which heats each label to 525° F. and compresses it at a pressure of 615 psi. against a molded polyethylene part with a dwell time of 6 to 7 seconds, melting the label and fusing it into the surface of the molded part.

The invention has been described with reference to the illustrated and presently preferred embodiments. It is not intended that the invention be unduly limited by this disclosure of the presently preferred embodiments. Instead, it is intended that the invention be defined, by the means and steps, and their obvious equivalents, set forth in the following claims:

What is claimed is:

1. A printing ink consisting essentially of:
   a) from 15 to 45 weight percent of finely subdivided resin particles selected from the class consisting of particles of high and ultra high molecular weight polyethylene having a density from 0.94 to 0.97 gm/cc., alone or in admixture with particles of polyethylene having a density from 0.91 to 0.94 gm/cc. and particles of polypropylene having a density greater than 0.9 gm/cc., said resin particles having a size from 1 nanometer to 150 microns;
   b) from 15 to 45 weight percent of a hydrocarbon solvent selected from the class consisting of aliphatic and aromatic hydrocarbons and having sufficient volatility for substantially total removal at a temperature from 300 F. to 500 F.;
   c) from 0.05 to 2.0 weight percent of a dispersant, sufficient to stabilize the dispersion of the resin particles in the hydrocarbon solvent; and
   d) from 1 to 70 weight percent of an additive selected from the class consisting essentially of a colorant, metallic particles, mineral particles and mixtures thereof.

2. The printing ink of claim 1 wherein said colorant is a pigment.

3. The printing ink of claim 1 wherein said additive is a mineral at a concentration from 5 to 45 weight percent.

4. The printing ink of claim 1 wherein said polyethylene resin particles have a size range from 0.1 to 100 microns.

5. The printing ink of claim 1 wherein said polyolefin resin has a melt index from 0.1 to 10 grams/10 minutes.

6. The printing ink of claim 1 wherein said polyethylene particles are present in an amount from 15 to 45 weight percent.

7. The printing ink of claim 1 wherein said additive is a colorant at a concentration from 1 to 45 weight percent.

8. The printing ink of claim 7 wherein said colorant is a dye.

9. A printing ink consisting essentially of:
   a) from 15 to 45 weight percent of finely subdivided resin particles selected from the class consisting of particles of high and ultra high molecular weight polyethylene particles having a density from 0.94 to 0.97 gm/cc. in admixture with polyethylene particles having a density from 0.91 to 0.94 gm/cc. and particles of polypropylene having a density greater than 0.9 gm/cc., said resin particles having a size from 1 nanometer to 150 microns;
   b) from 15 to 45 weight percent of a hydrocarbon solvent selected from the class consisting of aliphatic and aromatic hydrocarbons and having sufficient volatility for substantially total removal at a temperature from 300 F. to 500 F.;

c) from 0.05 to 2.0 weight percent of a dispersant, sufficient to stabilize the dispersion of the resin particles in the hydrocarbon solvent; and d) from 1 to 70 weight percent of an additive selected from the class consisting essentially of a colorant, metallic particles, mineral particles and mixtures thereof.

10. The printing ink of claim 9 wherein said resin particles comprise equal weight parts of medium density polyethylene particles having a density from 0.91 to 0.94 gm/cc. and said high and ultra high molecular weight polyethylene particles.

11. The printing ink of claim 1 including from 1 to 10 weight percent of a mineral sufficient to adjust the ink viscosity to an optimum value for printing.

12. The printing ink of claim 11 including from 1 to 10 weight percent of said mineral, sufficient to adjust the viscosity of the ink to an optimum value for printing.

* * * * *